(12) United States Patent
Saito et al.

(10) Patent No.: US 12,085,180 B2
(45) Date of Patent: Sep. 10, 2024

(54) RELIEF VALVE AND PUMP COVER

(71) Applicant: MITSUBA Corporation, Gunma (JP)

(72) Inventors: Hiroki Saito, Gunma (JP); Yusuke Fujita, Gunma (JP); Hiroshi Ooka, Gunma (JP); Masahiko Tsuchida, Gunma (JP)

(73) Assignee: MITSUBA Corporation, Gunma (JP)

( * ) Notice: Subject to any disclaimer, the term of this patent is extended or adjusted under 35 U.S.C. 154(b) by 33 days.

(21) Appl. No.: 18/010,210

(22) PCT Filed: Dec. 16, 2021

(86) PCT No.: PCT/JP2021/046413
§ 371 (c)(1),
(2) Date: Dec. 14, 2022

(87) PCT Pub. No.: WO2022/158182
PCT Pub. Date: Jul. 28, 2022

(65) Prior Publication Data
US 2023/0296184 A1 Sep. 21, 2023

(30) Foreign Application Priority Data
Jan. 22, 2021 (JP) .................. 2021-008844

(51) Int. Cl.
F16K 7/00 (2006.01)
F16K 17/04 (2006.01)
(Continued)

(52) U.S. Cl.
CPC .......... F16K 17/04 (2013.01); F16K 27/0209 (2013.01); F04C 14/24 (2013.01)

(58) Field of Classification Search
CPC ....... F16K 17/04; F16K 27/0209; F04C 14/24
See application file for complete search history.

(56) References Cited

U.S. PATENT DOCUMENTS 3,796,228 A * 3/1974 Bedo ................. F16K 17/04
137/543.13
5,921,274 A * 7/1999 Schuller ............. F04C 14/26
417/310

(Continued)

FOREIGN PATENT DOCUMENTS

| JP | H03107592 | 5/1991 |
| JP | 2015218651 | 12/2015 |
| WO | 2018173826 | 9/2018 |

OTHER PUBLICATIONS

"International Search Report (Form PCT/ISA/210) of PCT/JP2021/046413," mailed on Jan. 25, 2022, with English translation thereof, pp. 1-4.

(Continued)

Primary Examiner — P. Macade Nichols
(74) Attorney, Agent, or Firm — JCIPRNET

(57) ABSTRACT

The invention suppresses hysteresis. A relief valve switching between whether to discharge oil through movement of a valve body includes: a first spacing part, in which the valve body moves; a second space part, connected with the first space part and having a diameter smaller than a diameter of the first space part; an elastic body, connected with the valve body; a seal part, disposed in a circumferential direction of the valve body; and a third space part, formed in the first space part.

8 Claims, 17 Drawing Sheets

(51) Int. Cl.
*F16K 27/02* (2006.01)
*F04C 14/24* (2006.01)

(56) References Cited

U.S. PATENT DOCUMENTS

| | | | |
|---|---|---|---|
| 6,481,458 B2* | 11/2002 | Hirano | F16K 15/063 137/538 |
| 2012/0248362 A1* | 10/2012 | Williamson | F01M 1/16 251/324 |
| 2019/0107218 A1* | 4/2019 | Kruppe | F16K 27/0209 |

OTHER PUBLICATIONS

"International Preliminary Report on Patentability (Form PCT/IPEA/409) of PCT/JP2021/046413", mailed on Feb. 14, 2023, with English translation thereof, pp. 1-8.

* cited by examiner

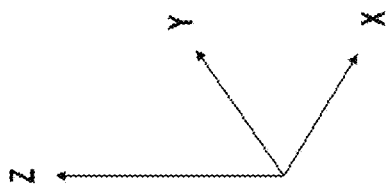
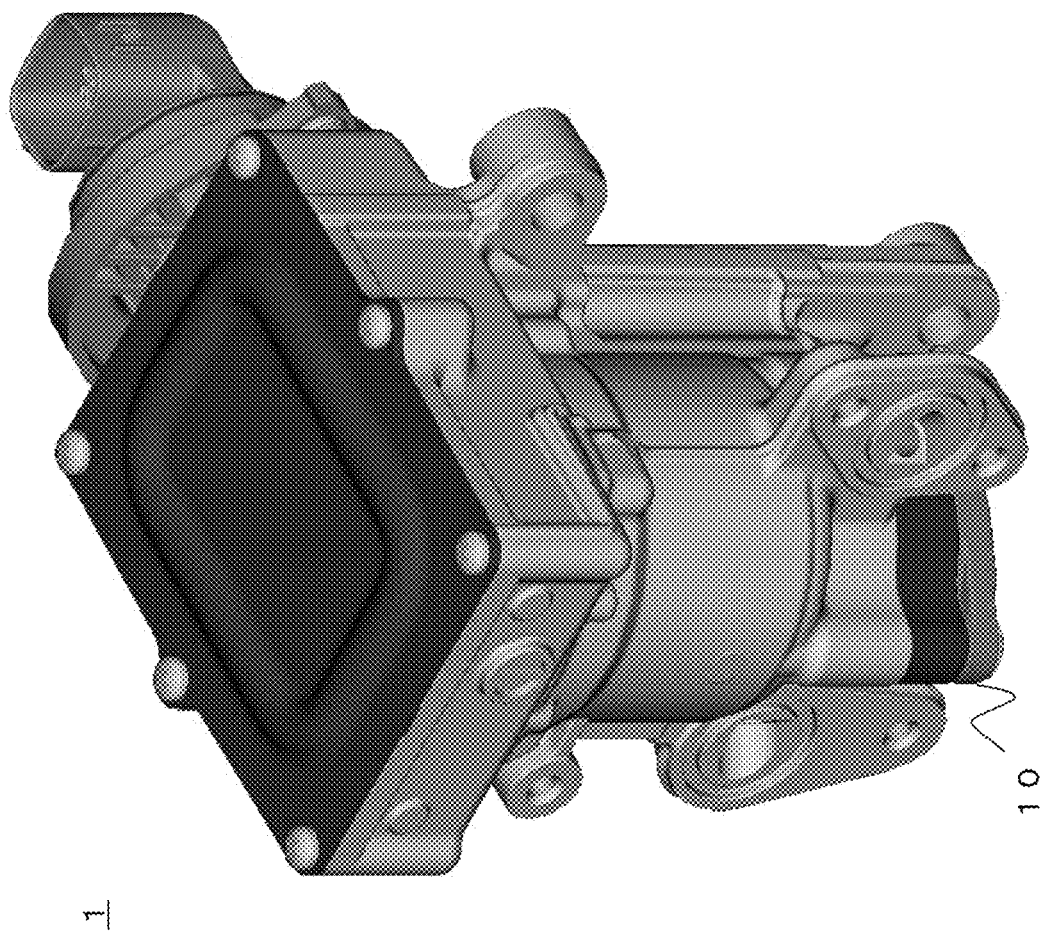
FIG. 1

RELIEF VALVE AND PUMP COVER

CROSS-REFERENCE TO RELATED APPLICATION

This application is a 371 application of the International PCT application serial no. PCT/JP2021/046413, filed on Dec. 16, 2021, which claims the priority benefits of Japan Patent Application No. 2021-008844, filed on Jan. 22, 2021. The entirety of each of the above-mentioned patent applications is hereby incorporated by reference herein and made a part of this specification.

TECHNICAL FIELD

The invention relates to a relief valve.

RELATED ART

In a pump, etc., with respect to a liquid such as oil, in order to prevent a predetermined pressure or more from being applied, a relief valve (also referred to as "safety valve" or "escape valve") allowing the liquid to escape is known. Specifically, in a pump cover to which a solenoid valve and a pressure sensor are installed, the opening/closing of an inlet is controlled by adjusting the position of an opening/closing part through an electromagnetic clutch. In addition, if the inlet opens based on the control that opens/closes the inlet, the inlet and the outlet are in communication, and the oil flowing through a flow path passes through the inlet and the outlet and is discharged. In this way, the solenoid valve makes adjustment, so that, through opening/closing, a portion of the oil flowing through the flow path flows through another flow path. For example, such technology is known (e.g., Patent Document 1, etc.).

CITATION LIST

Patent Literature

[Patent Document 1] International Publication No. 2018/173826

SUMMARY OF INVENTION

Technical Problem

In the technology disclosed in Patent Document 1, in the case where the pressure with respect to the release valve, etc., is high, the hysteresis tends to increase. Therefore, in the conventional art, if the design takes hysteresis into consideration, issues such as the increased size of the release valve, or the durability of parts, such as a spring, forming the release valve cannot be guaranteed may arise.

The invention has been made in view of the above matter, and an objective of the invention is to provide a relief valve capable of suppressing hysteresis.

Solution to Problem

According to the invention, a relief valve switching between whether to discharge oil through movement of a valve body includes: a first spacing part, in which the valve body moves; a second space part, connected with the first space part and having a diameter smaller than a diameter of the first space part; an elastic body, connected with the valve body; a seal part, disposed in a circumferential direction of the valve body; and a third space part, formed in the first space part.

Effects of Invention

According to the invention, a relief valve capable of suppressing hysteresis can be suppressed.

BRIEF DESCRIPTION OF DRAWINGS

FIG. 1 is a view illustrating an example of an oil pump.

DESCRIPTION OF EMBODIMENTS

In the following, the embodiments of the invention are described with reference to the drawings.

First Embodiment

FIG. 1 is a view illustrating an example of an oil pump. In the following, an oil pump 1 as shown is described as an example. The details of a relief valve are described in other figures. In addition, the relief valve may also be applied in a scenario other than the oil pump 1 as shown. For example, the relief pump is applicable as long as an oil pump handles oil with a certain degree of viscosity. In addition, the size, etc., of the oil pump is not limited.

For example, the oil pump 1 is an oil pump that can be used in an environment from −40° C. to 120° C.

In addition, the relief valve may further include a seal member, such as an O-ring. In the following, for the ease of description, the description is made with a simple configuration.

For example, the relief valve is integrally disposed with a pump cover 10 disposed for the oil pump 1. In this way, the pump cover 10 may be configured as having a relief valve. When the pump cover 10 is provided with a relief valve, the relief valve can be easily replaced even in an oil pump without a relief valve. In addition, by integrating the relief valve with the pump cover 10, the number of components can be reduced, thus the space can be saved.

In the following, an example in which the pump cover 10 and the relief cover are integrated is described. Specifically, the pump cover 10 is disposed as follows with respect to the oil pump 1.

Figure 2:
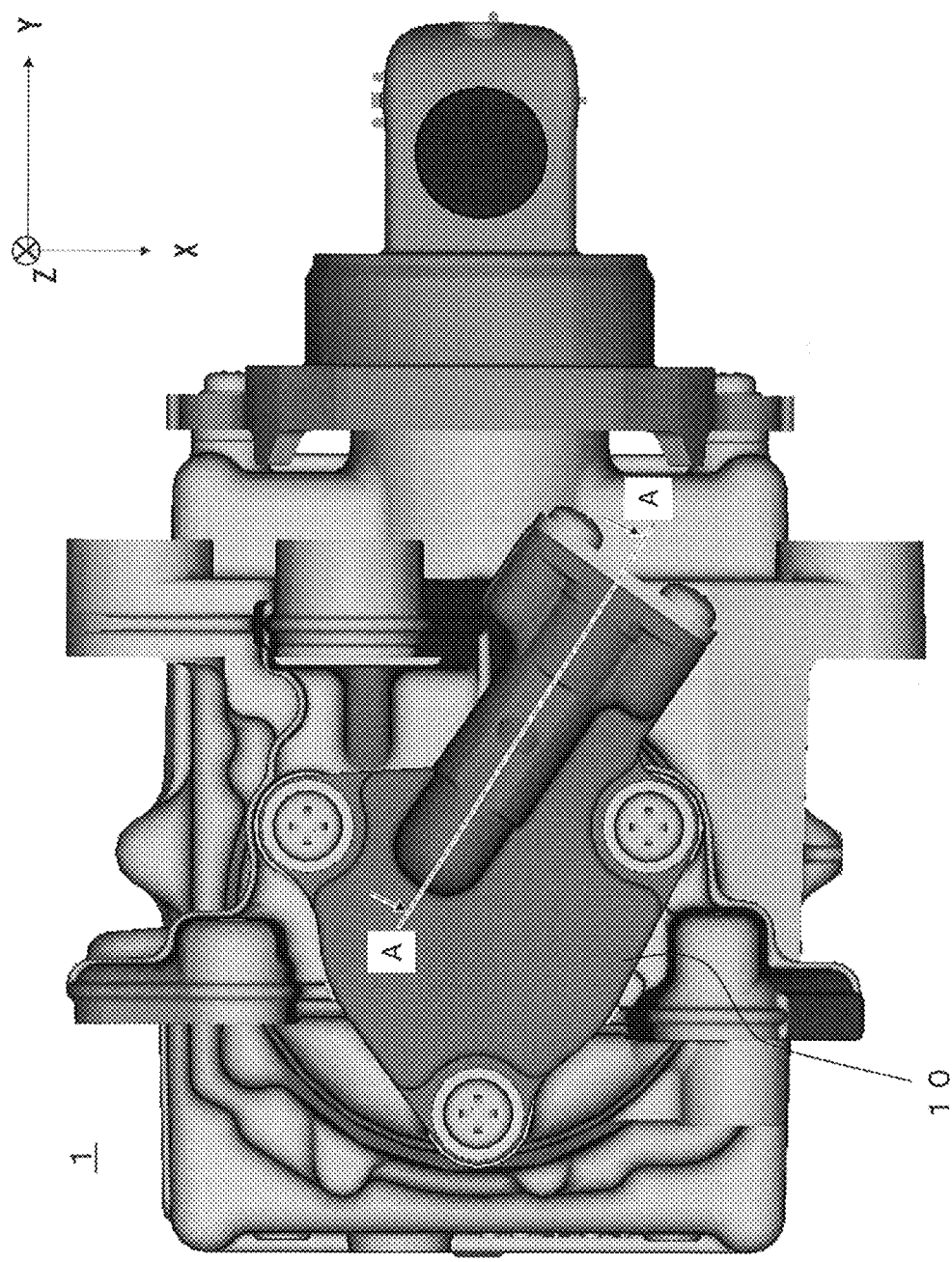
FIG. 2 is a view illustrating a configuration example of a pump cover.

FIG. 2 is a view illustrating a configuration example of a pump cover. For example, as shown in the figure, the pump cover 10 is disposed at, for example, the lowermost part of the oil pump 1 (the lowermost side in Z-axis direction in the figure, Z-axis direction being, for example, the gravity direction). The set position, the orientation, and the range, etc., of the pump cover 10 is not limited to those shown in the figure. That is, the pump cover 10, for example, may also disposed at a position other than the lowermost part of the oil pump 1.

In this way, the pump cover 10 is installed to a part serving as the main body of the oil pump 1 through screwing, etc.

The oil pump 1 performs an operation of sucking up oil and transmitting the oil to a predetermined position, etc. In such operation, if the discharge pressure of the pump exceeds a set pressure of the relief valve, the relief valve discharges the oil to the outside. In this way, if the discharge pressure of the pump exceeds the set pressure of the relief valve, the oil pump 1 operates the relief valve and discharges the oil to the outside. Therefore, the oil pump 1 suppresses the pressure (e.g., the pressure inside a pump discharge pipe or a casing) on the discharge side of the pump to be equal to or less than a predetermined pressure.

The pressure at which the relief valve discharges the oil to the outside, that is, the pressure that serves as reference for operating the relief valve to discharge the oil to the outside, is set in advance by taking into consideration a pressure-resistance strength, etc. In the following, the pressure at which the relief valve discharges the oil to the outside is referred to as "valve opening pressure" (may also be referred to as "set pressure" or "cracking pressure").

In addition, the oil discharge destination by the relief valve is, for example, the outside of the oil pump 1, etc. (including a drain, etc.). The oil discharge destination of the relief valve may be returned to the suction side.

Therefore, the valve opening pressure is a value set in accordance with a resistance pressure of a pipe on the pump discharge side or of a machine type.

[Configuration Example of Relief Valve]

Figure 3:
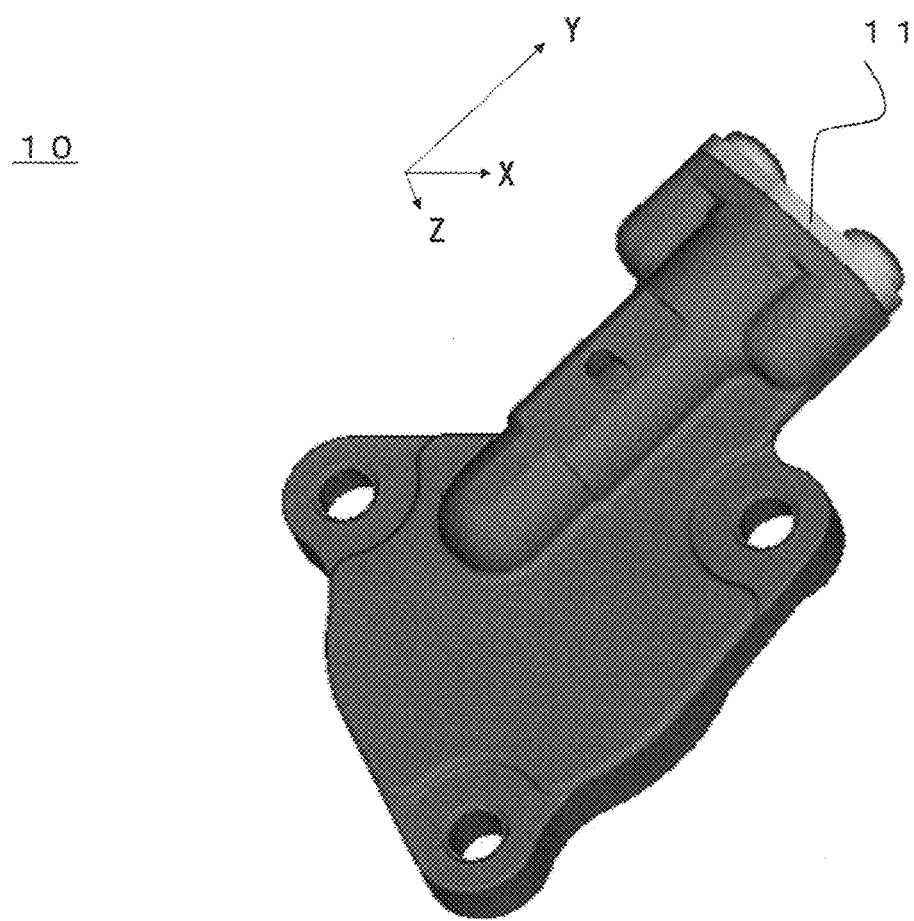
FIG. 3 is a first view illustrating an example of a pump cover having a relief valve.

FIG. 3 is a first view illustrating an example of a pump cover having a relief valve.

Figure 4:
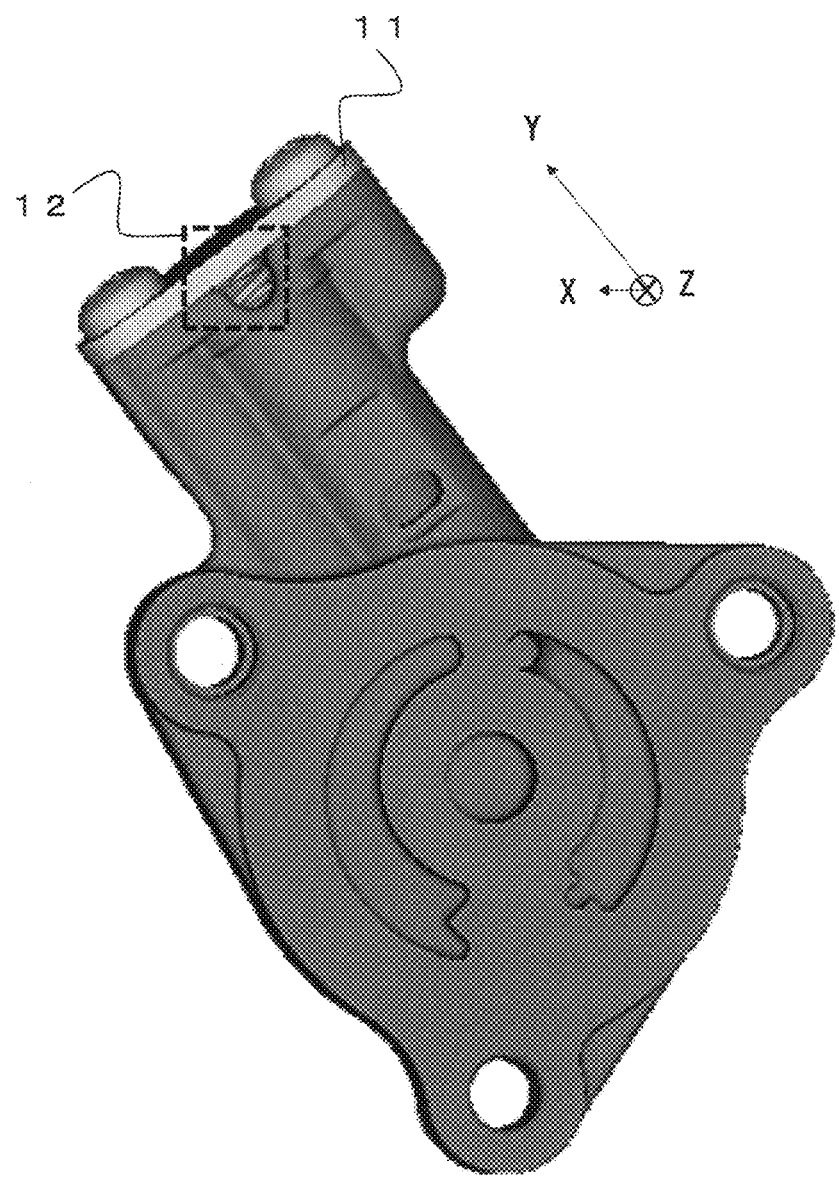
FIG. 4 is a second view illustrating an example of a pump cover having a relief valve.

FIG. 4 is a second view illustrating an example of a pump cover having a relief valve.

Regarding FIGS. 3 and 4, FIG. 3 mainly illustrates a surface (referred to as "front surface" in the following) of the pump cover 10, whereas FIG. 4 mainly illustrates a surface opposite thereto (referred to as "back surface" in the following).

For example, a relief plate 11 is disposed at a position as shown. In addition, in the example as shown, the pump cover 10 has a hole 12. Through such hole 12, the oil is discharged to the outside. The positions, the sizes and the shapes, etc., of the relief plate 11 and the hole 12 are not limited by the example as shown.

In the pump cover 10 as shown, the relief valve, for example, has a configuration as follows.

Figure 5:
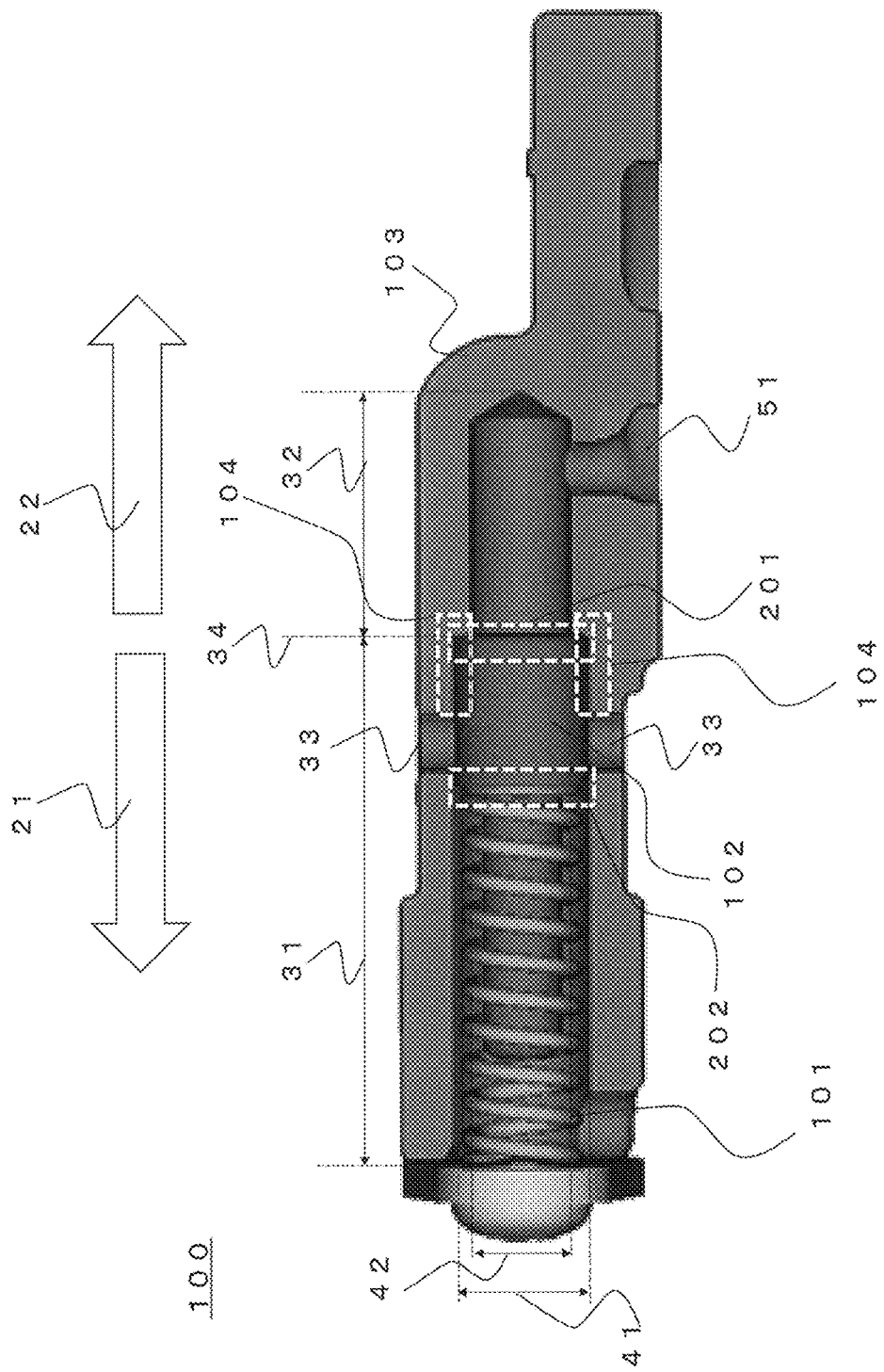
FIG. 5 is a view illustrating an example of a relief valve.

FIG. 5 is a view illustrating an example of a relief valve. The figure is a cross-sectional view illustrating a portion serving as a relief valve 100 in the pump cover 10. The cross-sectional view described in the following is a view illustrating a cross-section taken along "A-A" in FIG. 1.

The relief valve 100 is formed by, for example, a spring 101, a valve body 102, a housing 103, and a seal part 104, etc. The relief valve 100 may be oriented in consistency with the gravity direction. With such orientation, the inclination of the relief valve 100 can be easily suppressed, and the relief valve 100 can slide smoothly.

The spring 101 is an example of an elastic body. Specifically, the spring 101 is disposed to contact the valve body 102 (the figure illustrates an example in which the spring 101 is disposed on the left side of the valve body 102).

In the following description, an example in which the valve body 102 moves in the left-right direction of the figure is described. In the following description, the left direction in the figure is referred to as "first direction 21". In the following description, the right direction in the figure is referred to as "second direction 22".

Also, in the following example, the spring 101 expands and contracts in the first direction 21 and the second direction 22. Specifically, if a force is applied to the valve body 102 from the right direction, the spring 101 contracts in the first direction 21. In addition, if the force applied to the valve body 102 is reduced, the spring 101 expands in the second direction 22. That is, the spring 101 pushes and moves the valve body 102 in the second direction 22 by using a restoring force. Therefore, through the expansion and contraction of the spring 101, the valve body 102 moves reciprocally in the first direction 21 and the second direction 22.

In this way, it suffices as long as the elastic body is an object that generates a force moving the valve body 102 by using the restoring force. Therefore, the elastic body may also be an object other than the spring 101, and may also be a combination of the spring 101 and another object. However, in terms of oil resistance, heat resistance, durability, and contraction amount, etc., the elastic body may be a spring.

The housing 103 is in a shape having a first space part 31, a second space part 32, and a third space part 33, etc. Specifically, in the example as shown, the space part on the left side is the first space part 31, and the space part on the right side is the second space part 32.

The first space part 31 is a space part which is provided in the housing 102 and in which the valve body 102 moves reciprocally in the longitudinal direction. Therefore, the diameter (referred to as "first diameter 41" in the following, and the upper-lower direction is the radial direction in the figure) of the first space part 31 has a size that differs in accordance with the diameter of the valve body 102 or the spring 101, etc. In addition, the first direction 21 and the second direction 22 coincide with the longitudinal direction of the first space part 31.

The second space part 32 is a space part with a diameter (referred to as "second diameter 42" in the following) smaller than the first diameter 41. In this way, since the second diameter 42 is smaller than the first diameter 41, the boundary (simply referred to as "boundary 34" in the following) between the first space part 31 and the second space part 32, for example, has a diameter narrower than the first space part 31, thus a step difference is formed.

In addition, the first space part 31 and the second space part 32 are space parts adjacent and connected to each other. In the example as shown, the right end of the first space part 31 coincides with the left end of the second space part 32, and the two space parts, i.e., the first space part 31 and the second space part 32 are connected space parts. Therefore, the second space part 32 forms a flow path for the oil to flow from the main body of the oil pump 1 to the first space part 31.

In the second space part 32, for example, an inlet 51 is provided at the position as shown in the figure. In addition, the inlet 51 serves as a path through which the oil flowing from the main body of the oil pump 1 flows into the second space part 32. Specifically, from the lower side to the upper side in the figure, the oil flows from the inlet 51 to the second space part 32. Therefore, if the oil of a large amount or at a high pressure flows from the inlet 51 to the second space part 32, a high pressure in the first direction 21 is applied to the valve body 102.

In addition, the oil flowing to the second space part 32 and the spring 11 is in a position relationship of applying forces to facing surfaces. Specifically, the second space part 32 and the spring 101 are in a position relationship of being disposed symmetrically in the left-right direction of the figure by sandwiching the valve body 102. That is, the oil flowing to the second space part 32 and the spring 101 apply forces to opposite ends of the valve body 102 in the left-right direction.

In the following, in the ends of the valve body 102, the end connected to the first space part 31 and the second space part 32 (the one on the right side in the figure) is referred to as "first end", whereas the end different from the first end (the one on the left side in the figure) is referred to as "second end".

In addition, in the following description, among the surfaces of the valve body 102, the surface formed on the first end side is referred to as "first surface 201". Meanwhile, among the surfaces of the valve body 102, the surface formed on the second end side is referred to as "second surface 202", Therefore, the first surface 201 and the second surface 202 are in a position relationship of being surfaces opposite to each other in the valve body 102.

The spring 101, for example, is disposed to contact the second surface 202. Therefore, for example, the restoring force from the spring 101 is applied to the second surface 202. Thus, the restoring force is applied to the second surface 202 (a force from left to right in the figure). Therefore, the valve body 102 moves in the second direction 22 by using the restoring force.

Meanwhile, the oil flowing into the second space part 32 applies a pressure to the first surface 201. Therefore, the pressure from the oil is applied to the first surface 201 (a force from the right to the left in the figure), so the valve body 102 moves in the first direction 21 by using the pressure from the oil.

The third space 33 is a hole formed in the first space part 31. For example, the third space part 33 is formed to open in a vertical direction with respect to the first space part 31. That is, the first space part 31 is connected to the outside through the third space part 33. For example, the third space parts 33 are formed at two places, i.e., an upper part and a lower part, in the first space part 31.

Therefore, if the valve body 102 is moved in the first direction 21, and the third space parts 33 are open (in the configuration, the third space parts 33 open if the valve body 102 is moved to the left side with respect to the third space part 33), the relief valve 100 can discharge the oil to the outside.

Meanwhile, if the valve body 102 is moved in the second direction 22 and the third space parts 33 are blocked by the valve body 102 (in the figure, the third space parts 33 are blocked if the valve body 102 is moved to the right side with respect to the third space parts 33), the relief valve 100 can prevent the oil from being discharged to the outside.

In this way, the relief valve 100 switches between opening and closing of the third space parts 33 by reciprocally moving the valve body 102 through the force relationship between the restoring force of the elastic body and the pressure of the oil. Therefore, the position, etc., of the third space part 33 (the position in the left-right direction in the figure) is determined in accordance with the relationship about the pressure with which the third space part 33 is expected to be opened and closed. Thus, the position of the third space part 33 is determined in accordance with the elastic modulus of the spring, the valve opening pressure, and the diameter of the valve, etc. In addition, the shape, the number, and the diameter of the third space part 33 are determined in accordance with the oil discharge amount, that is, the drop amount of pressure due to discharge of the oil.

The seal part 104, for example, seals the outer diameter of the valve body 102 in the position as shown. Specifically, the seal part 104 is disposed in the circumferential direction of the valve body 102. That is, the seal part 104 is disposed in a vertical direction with respect to the direction (the left-right direction in the figure) in which the valve body 102 moves reciprocally. In addition, the position where the seal part 104 is disposed in a position that is a side surface with respect to the first surface 201 mainly receiving the pressure of the oil.

For example, the seal part 104 has a length about equal to or greater than one millimeter from the third space part 33. That is, the length from the third space part 33 to the boundary 34 is about equal to or greater than one millimeter.

With the seal part 104 disposed at such position and the wall part of the first space part 31, the oil flowing into the first space part 31 is sealed. In this example, the oil is in a state of not flowing to the right side with respect to the seal part 104 in the first space part 31.

In the state as shown, no oil flows into the second space part 32, or even if oil flows into the second space part 32, only a pressure weaker than the restoring force of the spring 101 is generated. In addition, the state is in a strength relationship in which the force (that is, the force in the first direction 21) pushing the valve body 102 resulting from the pressure from the oil is weaker than the force (that is, the force toward the second direction 22) with which the spring 101 pushes the valve body 102. That is, in such state, the force pushing the valve body 102 from the left side to the right side is stronger than the force pushing the valve body 102 from the right side to the left side.

In such state, as shown in the figure, the valve body 102 abuts against the step difference formed at the boundary 34 (that is, even with a force to the second direction 22, the valve body 102 cannot move rightward over the boundary 34).

In the following, the state in which the valve body 102 is stopped at the boundary 34 is referred to as "seated state". In addition, in the seated state, compared with the force of the spring 101, the pressure from the oil is not strong enough to separate the valve body 102 from the step difference.

Meanwhile, if the pressure from the oil increases to be equal to or greater than a certain level, the valve body 102 moves in the first direction 21 from the boundary 34.

In the following, a pressure from the oil being less than the valve opening pressure and starting to move the valve body 102 is referred to as "first pressure". Also, in the following description, a pressure (including the case where no oil flows into the second space part 32 and the pressure from the oil is "0") less than the first pressure is generally referred to as "second pressure".

Therefore, in the case of a pressure less than the first pressure, i.e., in the case of the second pressure, the valve body 102 is in the seated state.

Figure 6:
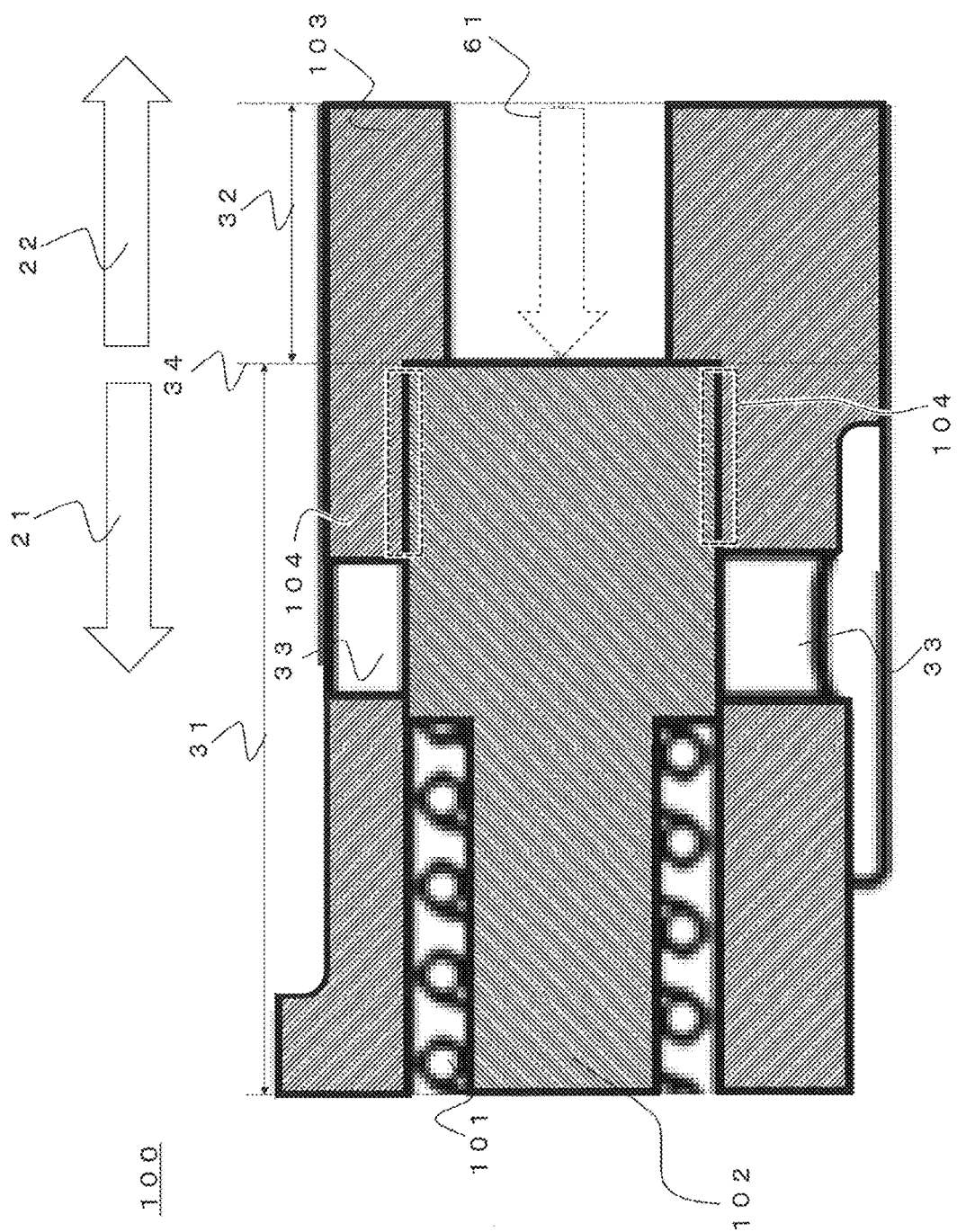
FIG. 6 is a view illustrating an example of a seated state.

FIG. 6 is a view illustrating an example of a seated state. FIG. 6 is a cross-sectional view, and is a simple view illustrating the same contents of FIG. 5. In the figure, the second pressure 61 is illustrated schematically. Also, in order to simplify the illustration, the recitation such as the inlet 51 is omitted in FIG. 6.

The seated state is a state in which the oil at least does not flow into the first space part 31. That is, in the seated state, the second space part 32 serves as a valve seat. In such state, due to the valve body 102 and the valve seat, the oil is blocked from flowing into the first space part 31. In addition, in the seated state, the third space part 33 is blocked and no oil is discharged.

With respect to such a seated state, due to an oil pressure change, the relief valve 100 is changed to an unseated state, or a valve-opened state, as in the following.

[Example of Unseated State]

Figure 7:
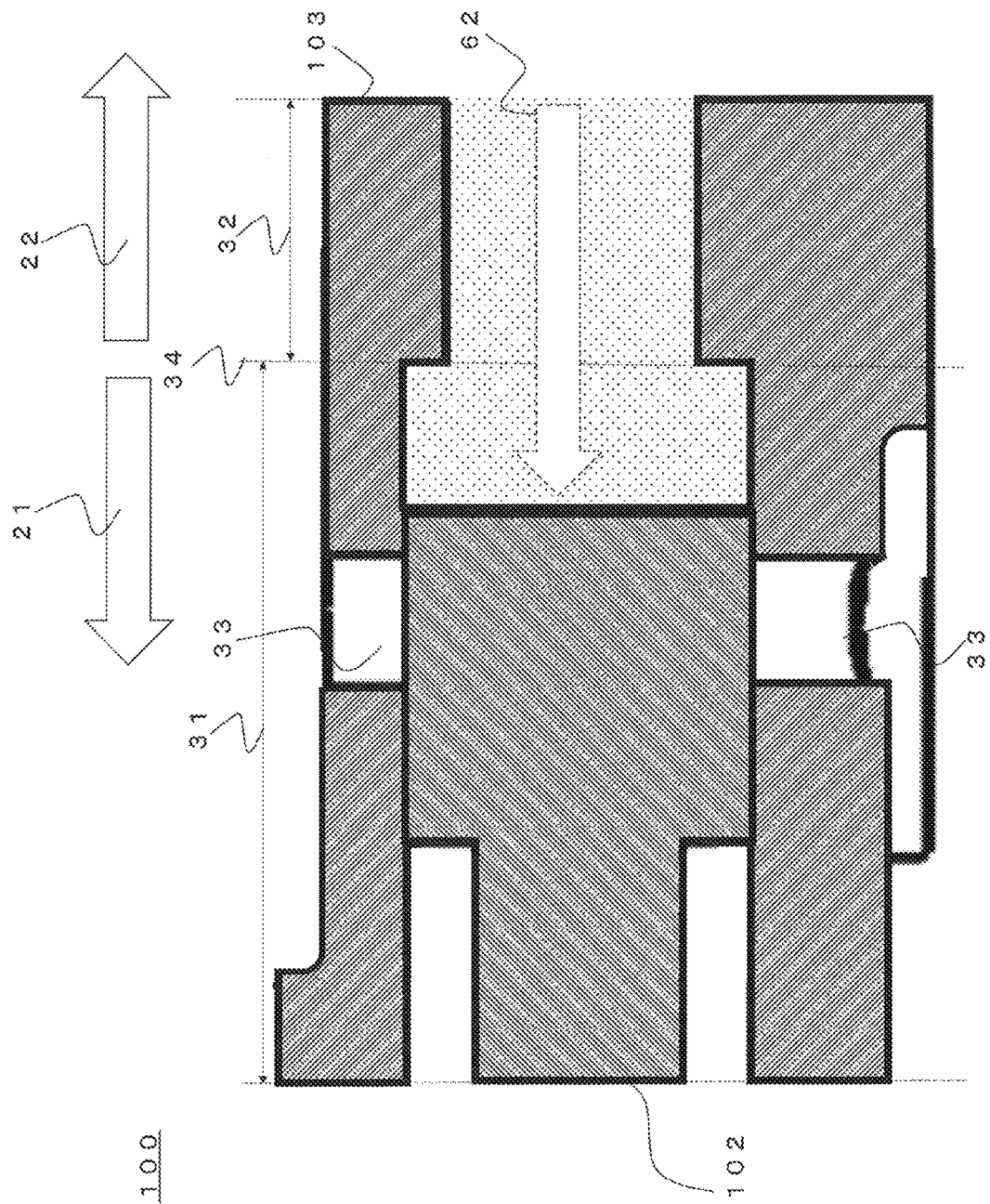
FIG. 7 is a view illustrating an example of an unseated state.

FIG. 7 is a view illustrating an example of an unseated state. Like FIG. 6, FIG. 7 is a cross-sectional view. In the figure, a pressure less than the valve opening pressure and equal to or greater than the first pressure is schematically recited as "first pressure 62". Also, in order to simplify the illustration, FIG. 7 omits the illustration of the state in which the spring 101 is contracted, etc.

For example, the first pressure 62 is a pressure obtained through calculation based on "Valve opening pressure−Seal part length×Spring constant÷Seal part cross-sectional area".

Compared with the seated state, firstly, the state shown in FIG. 7 (referred to as "unseated state" in the following) differs in that the oil flows from the second space part 32 to the first space part 31, and the pressure from the oil is higher than the seated state. Thus, the unseated state differs in that, as the oil flows in, the valve body 102 is pushed by the pressure, and is moved toward the left side with respect to the illustration of FIG. 6. As a result, the unseated state differs in that the valve body 102 is separated from the step difference. That is, the unseated state differs in that the valve body 102 moves in the first direction 21 with respect to the seated state.

As shown in the figure, if the pressure is less than the valve opening pressure and equal to or more than the first pressure, the valve body 102 moves in the first direction. However, since the pressure from the oil is less than the valve opening pressure, the third space part 33 is blocked. That is, in the unseated state, the oil is sealed. Therefore, the oil is not discharged to the outside in the unseated state.

In such unseated state, if the pressure is reduced, the valve body 102 is moved in the second direction 22 by the restoring force of the spring 101. Then, if the pressure drops to the second pressure, the state returns to the seated state. Meanwhile, if the pressure is further increased from the unseated state to be equal to or greater than the valve opening pressure, the relief valve 100 is in the valve-opened state as in the following.

[Example of Valve-Opened State]

Figure 8:
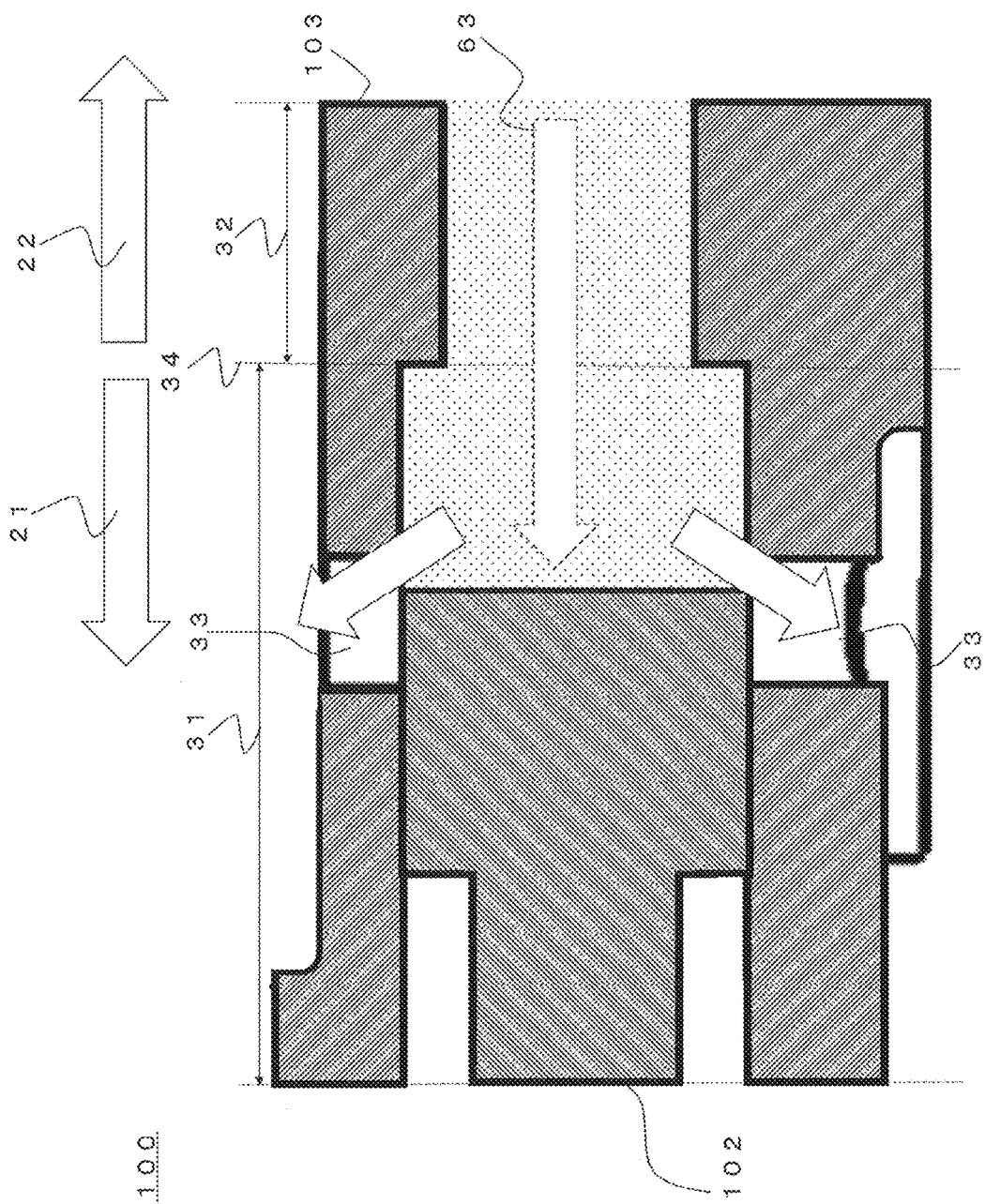
FIG. 8 is a view illustrating an example of a valve-opened state.

FIG. 8 is a view illustrating an example of a valve-opened state. Like FIG. 7, FIG. 8 is a cross-sectional view. In the figure, a pressure equal to or more than the valve opening pressure is schematically recited as "valve opening pressure 63".

Compared with the seated state, firstly, the state shown in FIG. 8 (referred to as "valve-opened state" in the following) differs in that the pressure from the oil is higher than that in the unseated state. With such pressure, the valve body 102 is pushed further by the pressure as compared to the unseated state, and the valve body 102 is moved further toward the left side than the state shown in FIG. 7. As a result, the valve-opened state differs in that the third space part 33 is opened, and the oil is discharged. That is, the valve-opened state differs in that the valve body 102 is moved further along the first direction 21 with respect to the unseated state.

When the pressure from the oil is as strong as or stronger than the valve opening pressure, the third space part 33 is connected with the first space part 31. Since the oil flowing to the first space part 31 is pressurized, the oil is discharged to the outside through the third space part 33.

As described in the above, the relief valve 100 opens and closes the valve by switching between the valve-opened state and a valve-closed state (the unseated state or the seated state) other than the valve-opened state. In this way, the relief valve 100 switches between whether to operate to discharge the oil to the outside.

With such configuration, the diameter difference is small between switching to discharge the oil or not, that is, before and after opening. In this way, since the difference in pressure receiving area can be reduced, the relief valve 100 can suppress the pressure difference between before and after opening, that is, the hysteresis. Specifically, the result is as follows.

Figure 9:
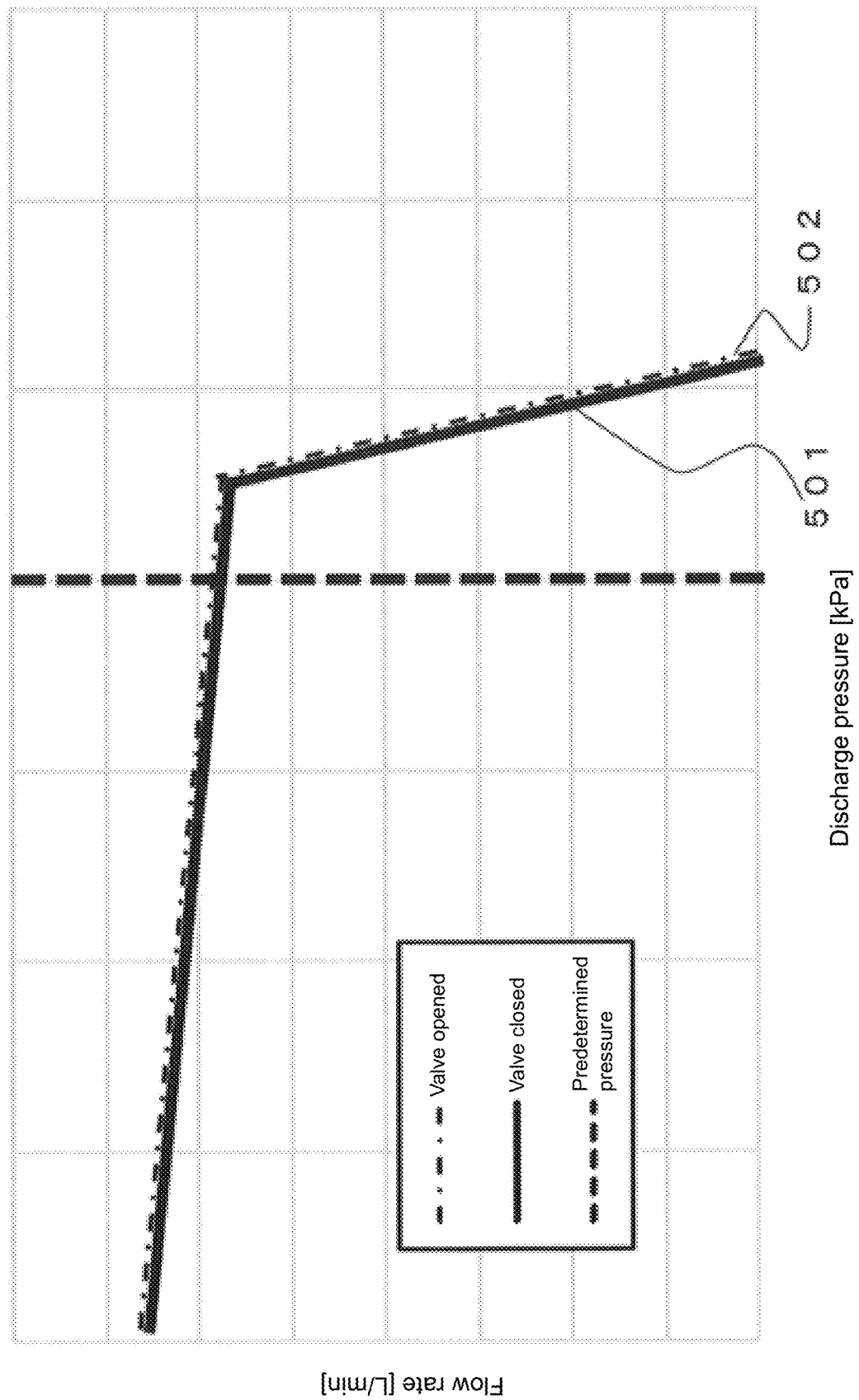
FIG. 9 is a diagram illustrating experimental results.

FIG. 9 is a diagram illustrating experimental results. In the figure, the horizontal axis indicates the discharge pressure (unit: kilopascal), and the vertical axis indicates the oil flow rate (unit: liter per minute).

A first graph 501 indicates the time when the valve is closed.

A second graph 502 indicates the time when the valve is opened.

The first graph 501 and the second graph 502 are graphs illustrating the characteristics of the release valve 100 according to the configuration shown in FIG. 5, etc.

As shown in the first graph 501 and the second graph 502, in the case where the valve is opened as well as when the valve is closed, the change of the discharge pressure with respect to the flow rate is substantially the same. In this way, since the pressure change is substantially the same, the relief valve 100 according to the configuration shown in FIG. 5, etc. can suppress the hysteresis, that is, the pressure difference between the time when the valve is opened and the time when the valve is closed.

In addition, with the configuration of the seal part 104 as the above, the size of the relief valve 100 can be reduced. Also, with the above configuration, the relief valve 100 can be provided in a simple configuration.

A step difference or a taper part may also be further formed at the boundary 34 or in the second space part 32.

In accordance with the valve opening pressure, the types, etc., of the respective forming components provided in the relief valve may also be changed. For example, the size, the shape, or the position relationship of each hole may also be configured other than the example as shown.

[Comparative Example]

An example of a relief valve (simply referred to as "comparative example 600" in the following) that serves as a comparative example is described in the following.

Figure 10:
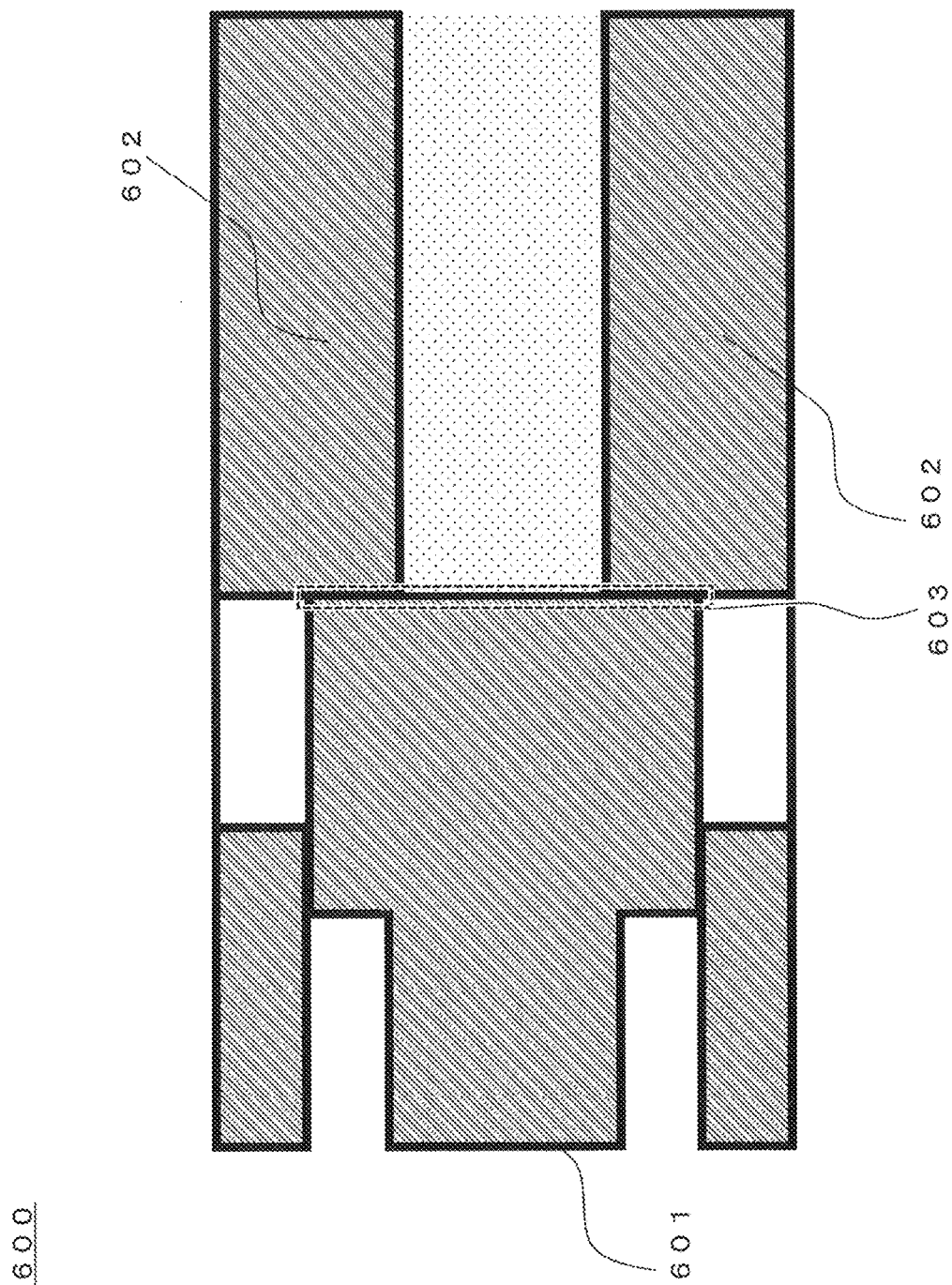
FIG. 10 is a view illustrating a valve-closed state of a comparative example.

FIG. 10 is a view illustrating a valve-closed state of the comparative example. The comparative example 600 differs in not having a step difference, etc., in the boundary. In addition, the comparative example 600 differs in having a configuration that seals at an abutting surface 603.

As shown in the figure, in the valve-closed state where the pressure is low, the valve is closed by a valve body 601 and a valve seat 602. Then, if the pressure increases, the comparative example 600 is changed to the valve-opened state in the following.

Figure 11:
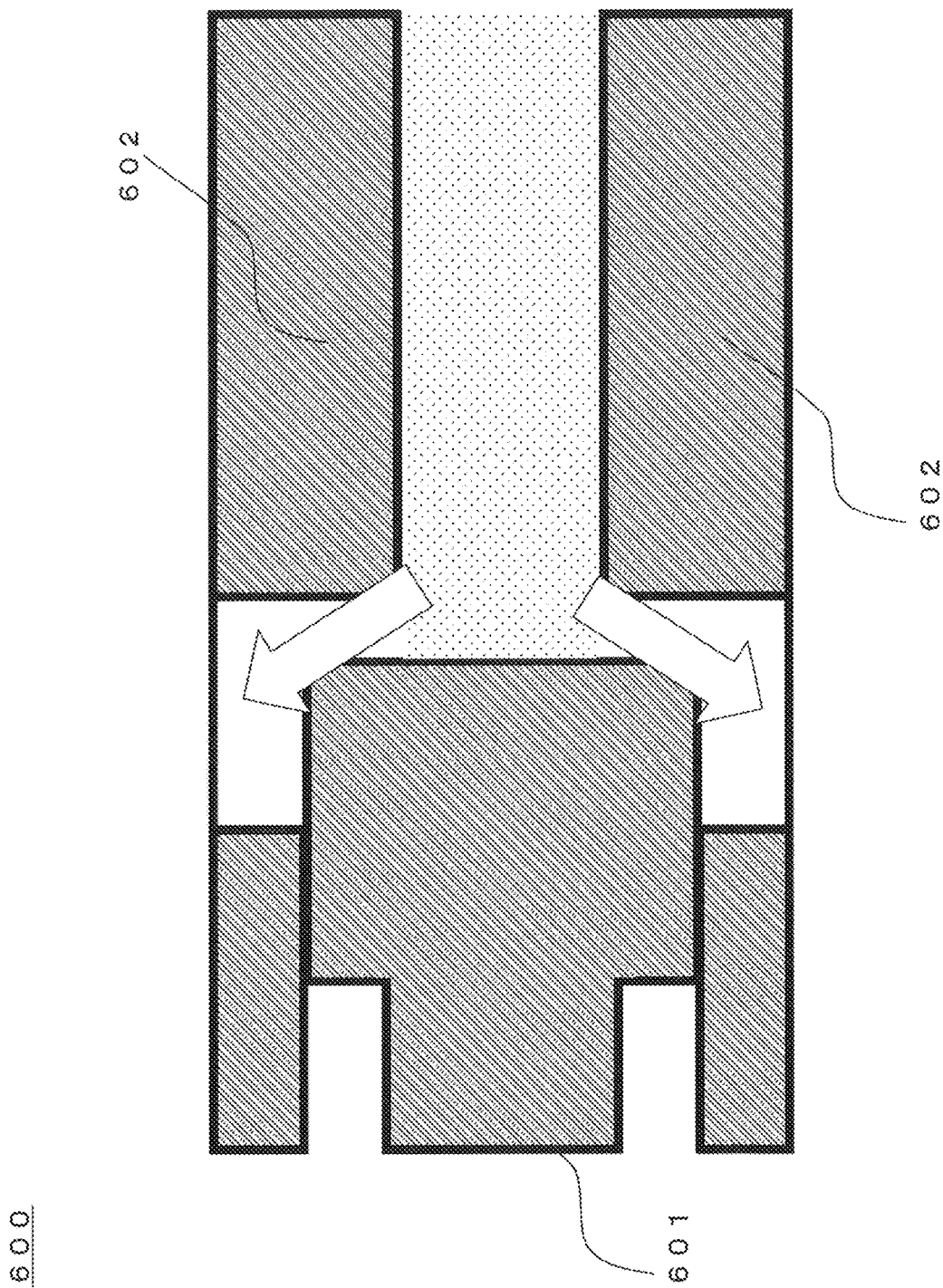
FIG. 11 is a view illustrating a valve-opened state of a comparative example.

FIG. 11 is a view illustrating a valve-opened state of the comparative example. FIG. 11 differs from the valve-opened state in that the valve body 601 is separated from the valve seat 602 due to the pressure of the oil.

With the configuration of the comparative example 600, the difference in the pressure receiving area between before and after the valve is opened tends to be large. Therefore, the hysteresis, which is the pressure difference between the valve opening operation and the valve closing operation, tends to increase. Specifically, if the comparative example 600 is adopted, the result is as follows.

Figure 12:
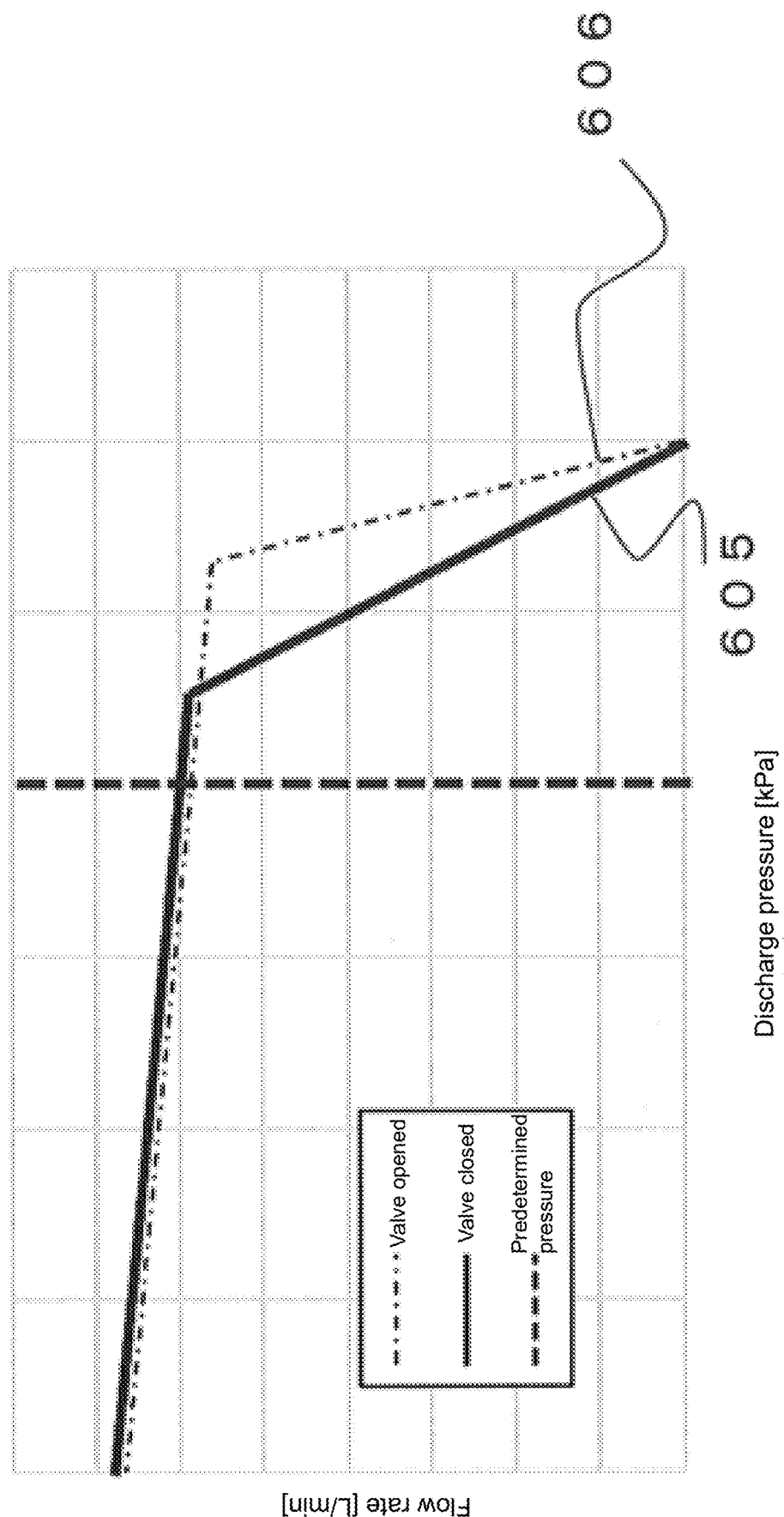
FIG. 12 is a diagram illustrating experimental results according to a comparative example.

FIG. 12 is a diagram illustrating experimental results according to a comparative example. The horizontal axis and the vertical axis are the same as in FIG. 9.

A third graph 605 indicates the time when the valve is closed.

A fourth graph 606 indicates the time when the valve is opened.

The third graph 605 and the fourth graph 606 are graphs illustrating the characteristics of the comparative example 600 shown in FIG. 10, etc.

Since the pressure receiving area changes significantly before and after the valve is opened, as illustrated in FIG. 11, the characteristic when the valve is closed as indicated by the third graph 605 and the characteristic when the valve is opened as indicated by the fourth graph 606 tend to differ significantly. Therefore, the hysteresis tends to increase.

[Regarding Linear Expansion Coefficient]

The material forming the valve body 102 and the material forming the first space part 31, etc., may have the same linear expansion coefficient or differ in linear expansion coefficient by 20% or less. That is, the material of the valve body 102 and the material forming the first space part 31 may have a small difference in linear expansion coefficient and may exhibit the same degree of expansion/contraction resulting from temperature change.

For example, if the material forming the first space part 31 is more expandable due to temperature than the material of the valve body 102, a gap may be easily generated in the case where the temperature is high in the relief valve 100 or in the periphery of the relief valve 100. If such gap is present, the oil may tend to leak through the gap. Meanwhile, if the linear expansion coefficient is the same or the difference in linear expansion coefficient is less than or equal to 20%, even if there is a temperature change, the oil leakage from the relief valve 100 can be prevented as a gap is hardly generated.

For example, for making the linear expansion coefficient the same or making the difference in linear expansion coefficient less than or equal to 20%, the same material or a combination of materials with similar linear expansion coefficients may be adopted as the material of the valve body 102 and the material for forming the first space part 31, etc. Specifically, a practical metal such as aluminum may be adopted for both the material of the valve body 102 and the material forming the first space part 31, etc. For example, the aluminum "A6061" (specification of JIS) is a material with a linear expansion coefficient of $23.6 \times 10^{-6}$.

For example, the material of the valve body 102 and the material forming the first space part 31, etc., may be a combination of aluminum (e.g., "A2017", "A5052", "A5056", or "A7075", etc.) and brass (e.g., "C2081", "C3604", or "C2700", etc.), copper (e.g., "C1100" or "C1020", etc.) and brass, stainless steel (e.g., austenitic stainless steel of SUS300 series) and copper, stainless steel and brass, aluminum and magnesium alloy (e.g., "AZ31" or "AZ91", etc.) or cast iron and titanium. The material of the valve body 102 and the material forming the first space part 31, etc., may also be a combination of cast iron, structural steel (e.g., "SS400", etc.), carbon steel (e.g., "S45C", etc.), tool steel (e.g., "SKS3" or "SKD11", etc.), and stainless steel (e.g., martensitic stainless steel of SUS 400 series), etc.

When the above materials are combined, the difference in linear expansion coefficient may be 12% or less, and the difference in linear expansion coefficient can be reduced.

Second Embodiment

An oil pump, for example, may be configured to have a pump case and a pump rotor as in the following.

Figure 13:
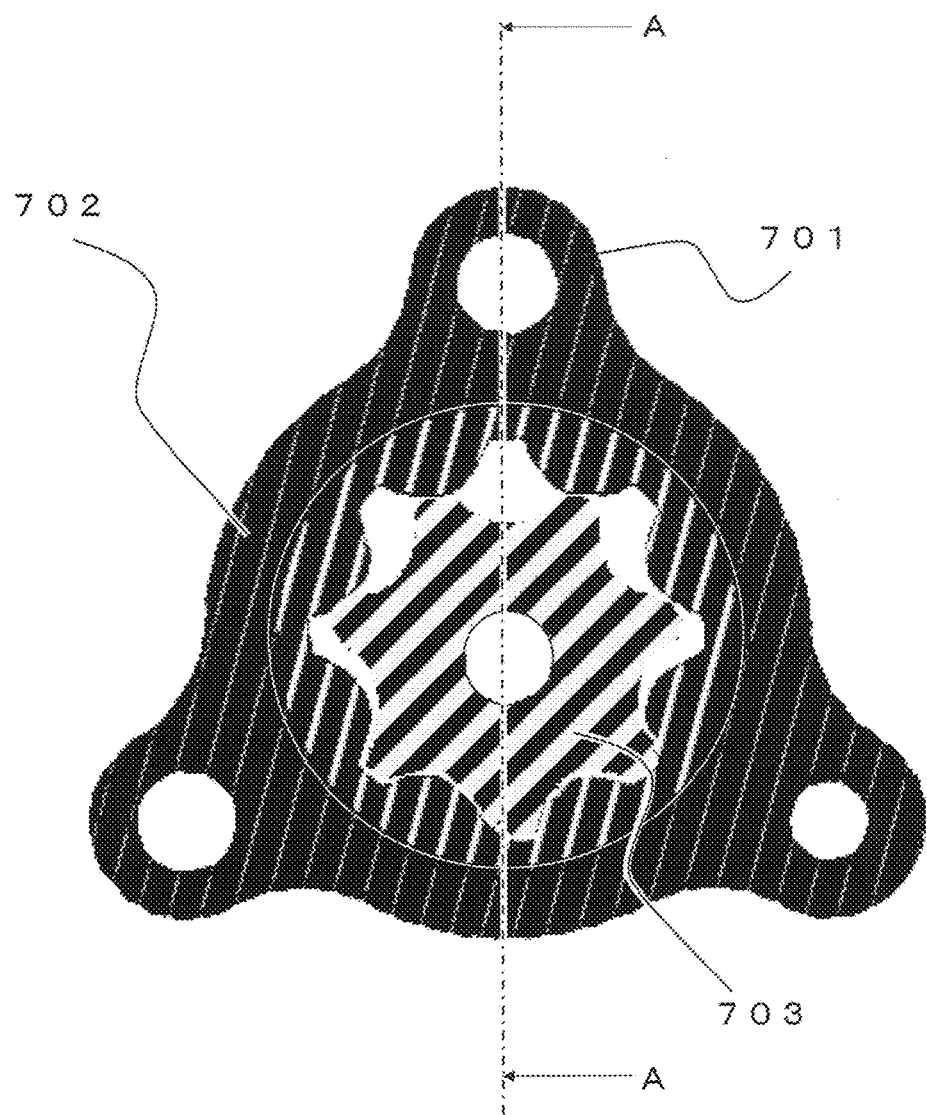
FIG. 13 is a view illustrating a configuration example of a pump case and a pump rotor.

FIG. 13 is a view illustrating a configuration example of a pump case and a pump rotor. For example, the oil pump 1 has a pump case 701 and a pump rotor 703 as shown. The figure is a cross-sectional view of the pump case 701 and the pump rotor 703.

For example, the pump rotor 703 is in contact with the inner wall (simply referred to as "inner wall part 702" in the following) of the pump case 701 as shown.

In the following, a cross-section of "A-A" is described.

Figure 14:
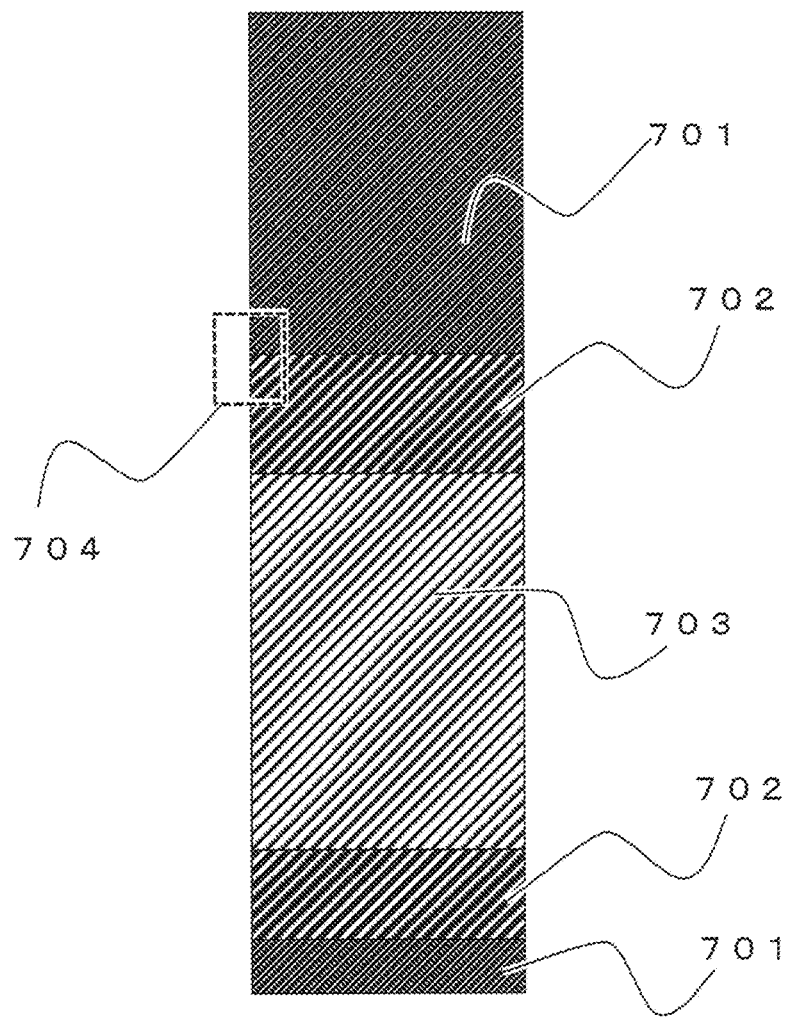
FIG. 14 is a view illustrating an example of a contact part of a pump case and a pump rotor.

FIG. 14 is a view illustrating an example of a contact part of a pump case and a pump rotor. The figure is a cross-sectional view taken along the cross-section of "A-A" shown in FIG. 13.

In the case where the pump case 701 and the pump rotor 703 are in contact in this way, for example, a portion as shown serves as a contact part (simply referred to as "contact part 704" in the following) of the pump case 701 and the pump rotor 703.

In the following, the contact part 704 is enlarged for description.

Figure 15:
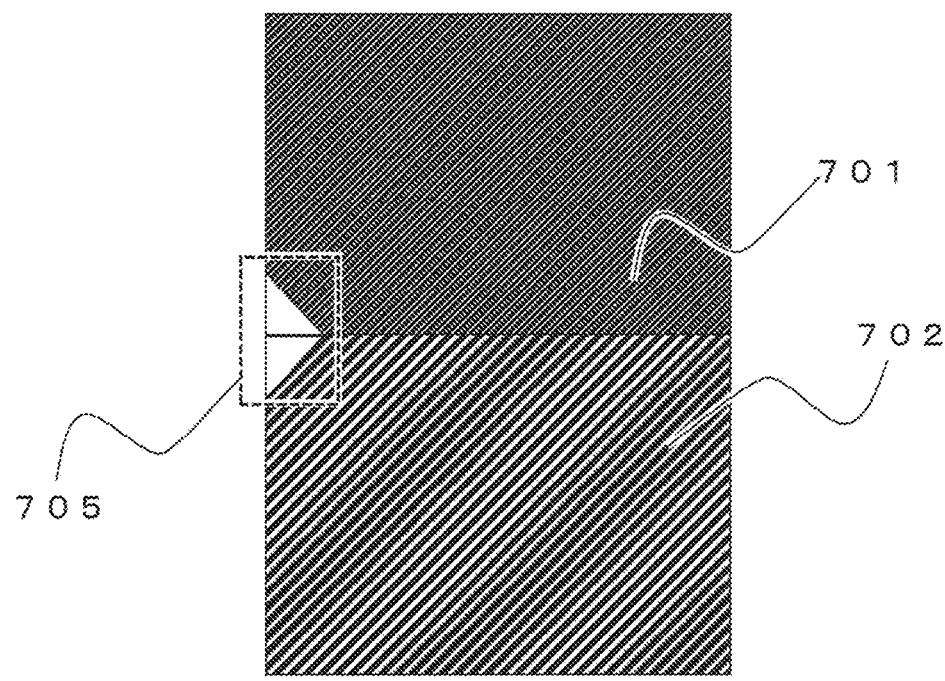
FIG. 15 is a view illustrating an example of a contact part.

FIG. 15 is a view illustrating an example of a contact part. For example, in the contact part 704, a chamfering process is performed at the position indicated in the figure, and a chamfered part 705 is formed.

The chamfered part 705 may also be formed at a different position.

Such chamfered part 705 may serve as a gap. Thus, when served as a gap, a foreign matter may enter. For example, a foreign matter may enter the oil path or an intrusion path such as being brought in by a part during assembling. In addition, a foreign matter may be, for example, metal such as a cutting burr. In addition, if the foreign matter is inserted and pushed into the chamfered part 705, the oil pump 1 may be locked. In particular, when being pushed by a high hydraulic pressure, etc., the oil pump 1 tends to be locked. Therefore, regarding the entry of such foreign matter, a configuration as follows is formed.

Figure 16:
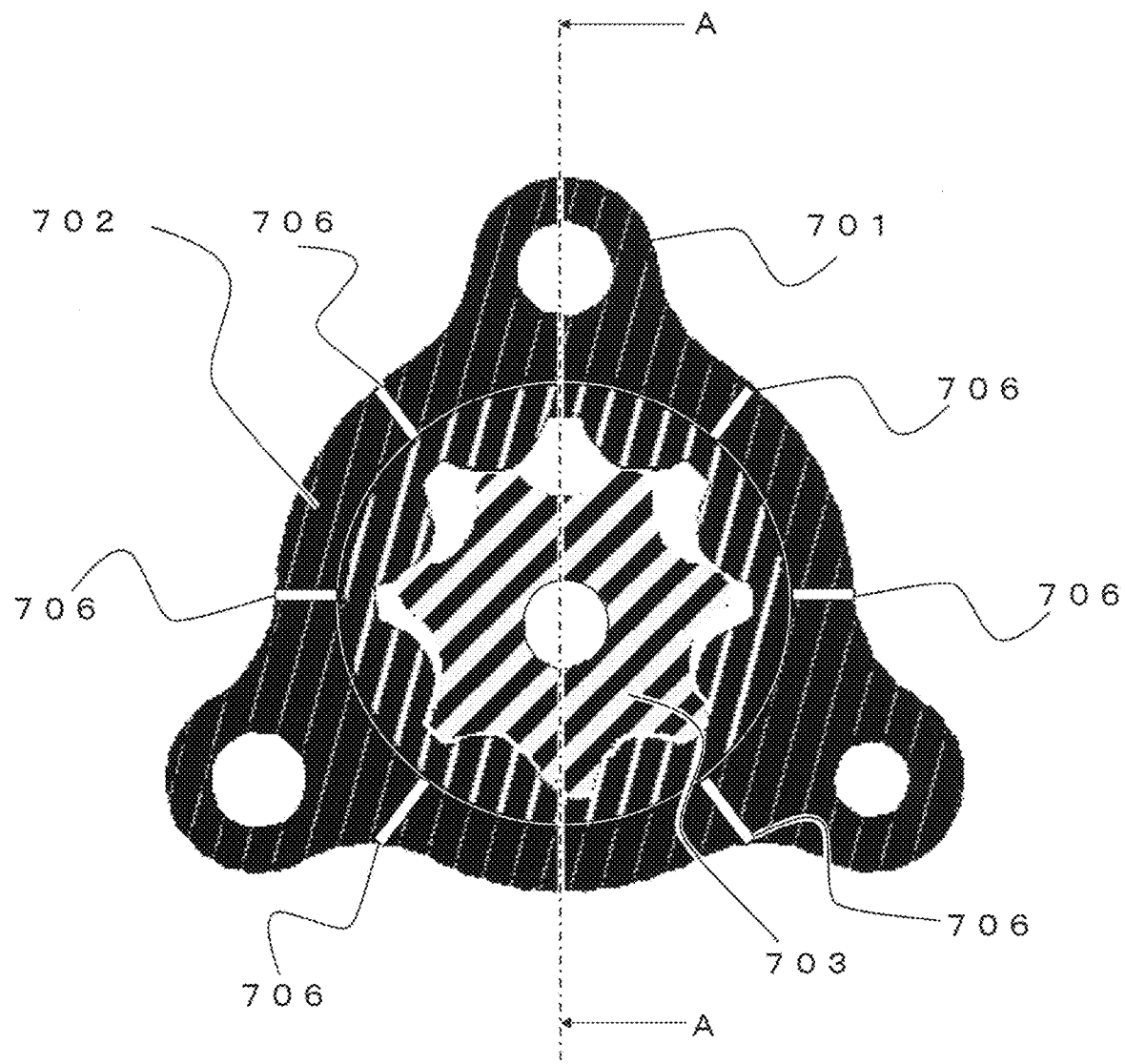
FIG. 16 is a view illustrating an example of formation of a groove.

FIG. 16 is a view illustrating an example of formation of a groove. Like FIG. 13, the figure is a cross-sectional view. For example, a groove 706 is formed in the pump case 701 at a position as shown.

The groove 706 connects the pump case 701 and the inner wall part 702 and is formed in an orthogonal direction with respect to the circumference of the pump case 701, so as to lead to the outside of the pump case 701. That is, the groove 706 is formed in the pump case 701, so that the chamfered part 705 and the outside of the pump case 701 are in communication with each other.

For example, in the example as shown, the grooves 706 are formed at six positions at substantially equal intervals in directions orthogonal to the circumference of the pump case 701, so that the outside of the pump case 701 and the inner wall part 702 are in communication with each other.

When the pump case 701 is formed with such grooves 706, even if a foreign matter enters, the foreign matter can be discharged to the outside through the grooves 706.

The grooves 706 may have intervals, positions, arrangements, and numbers different from those as shown. That is, the grooves 706 may also be formed at positions other than those shown in the figure. For example, the grooves 706 may also be formed at more or fewer than six positions.

However, the more the grooves 7 are formed, the more the oil is discharged. Therefore, the number of the grooves 706 that are formed may be determined in accordance with an allowable discharge amount of the oil, etc. Thus, for example, in the case with a greater allowable discharge amount, a greater number of the grooves 706 may be formed. In this way, if the number of the grooves 706 that are formed is determined within the allowable oil discharge amount, the oil can be prevented from being excessively discharged from the grooves 706.

Also, as shown in the figure, the grooves 706 may also be arranged symmetrically. For example, the grooves 706 may be disposed on the discharge side (that is, a high pressure side). In addition, the grooves 706 may also be omitted (not disposed) on the suction side.

If the grooves 706 are disposed on the suction side, the chance of sucking in air, foreign matters, or both from the grooves 706 is increased. Therefore, the arrangement of the grooves 706 may focus on the discharge side, and fewer grooves 706 are disposed on the suction side.

In this way, if the grooves 706 are mainly disposed on the discharge side, the chance that a foreign matter, etc., enters from the grooves 706 can be reduced.

Third Embodiment

In the case of a trochoid pump, a mark as described in the following, for example, is provided in the oil pump 1.

Figure 17:
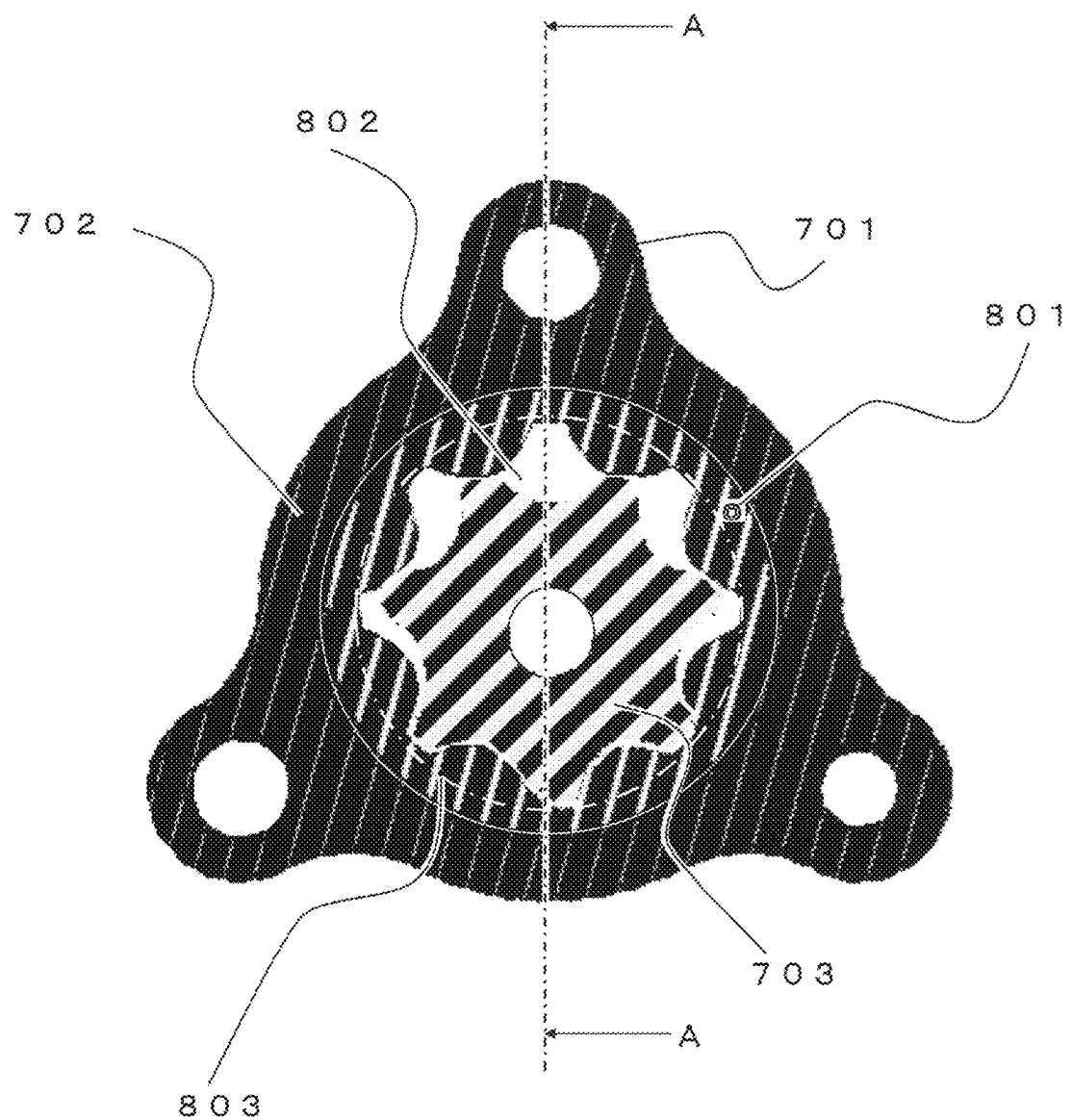
FIG. 17 is a view illustrating an example of setting of a mark.

FIG. 17 is a view illustrating an example of setting of a mark. For example, a mark 801 may be disposed at a position, etc., as follows.

The mark 801, for example, is an identification mark, etc. In addition, the mark 801 is formed on the front surface of the oil pump 1. Specifically, the mark 801 is in a concave shape. That is, the mark 801 is formed as a recess, etc. With such mark 801, the front side and the back side of the trochoid pump can be identified. The mark 801, for example, may also be applied to an oil pump, such as a vane-pump.

Since the mark 801 is in a concave shape, if the mark 801 is provided on an oil path (simply referred to as "oil path 802" in the following), a foreign matter may be sucked in. For example, the flow path 802 is in a hatched range in the drawing. A foreign matter may be, for example, metal such as a cutting burr.

In this way, if a foreign matter is sucked into a portion of the mark 801, the foreign matter may be caught at inlet and outlet ports. If a foreign matter is caught like this, the oil pump 1 may be locked.

Therefore, the mark 801 may be formed outer of an outer diameter line (simply referred to as "outer diameter line 803" in the following) of the port. That is, if the mark 801 is formed outer of the outer diameter line 803, the chance that the mark 801 sucks in a foreign matter can be reduced. Therefore, the so-called jamming of a foreign matter (that is, a foreign matter being caught) can be reduced. Therefore, the locking of the oil pump 1 due to a foreign matter can be reduced.

The outer diameter line 803 is a line that coincides with a tooth bottom diameter of the outer of a pump gear.

Other Embodiments

For example, in an embodiment, a pump cover, etc., has a release valve. In addition, the pump cover is used in an oil pump of a trochoid type, for example.

The embodiment may also be implemented in a configuration having components other than those described above. Also, the respective components may have shape or number other than those described above.

Although the embodiments of the invention have been described in detail with reference to the drawings, the specific configuration is not limited to the embodiments. In other words, the design etc., within the scope not departing from the gist of the invention are also included in the right.

What is claimed is:

1. A relief valve, switching between whether to discharge oil through movement of a valve body, the relief valve comprising:
    a first spacing part, in which the valve body moves;
    a second space part, connected with the first space part and having a diameter smaller than a diameter of the first space part;
    an elastic body, connected with the valve body;
    a seal part, disposed in a circumferential direction of the valve body; and
    a third space part, formed in the first space part,
    wherein the first space part and the second space part are connected at a first end of the first space part, and
    the seal part is disposed at a position that is a side surface with respect to a first surface formed on a side of the first end, among surfaces which the valve body has, in a vertical direction with respect to a direction in which the valve body moves reciprocally, and extends from the third space part to a boundary between the first space part and the second space part.

2. The relief valve as claimed in claim 1, wherein in a case where a pressure from the oil flowing to the second space part is equal to or greater than a valve opening pressure, the valve body moves in a first direction in a longitudinal direction of the first space part from the third space part to discharge the oil from the third space part,
    in a case where the pressure from the oil flowing to the second space part is less than the valve opening part and equal to or greater than a first pressure, the valve body moves in the first direction and blocks the third space part so that the oil is not discharged from the third space part, and
    in a case where the pressure from the oil flowing to the second space part is less than the first pressure, the valve body moves in a second direction by using a restoring force of the elastic body.

3. The relief valve as claimed in claim 1, wherein a material of the valve body and a material forming the first space part have a same linear expansion coefficient, or differ in linear expansion coefficient by 20% or less.

4. The relief valve as claimed in claim 1, wherein a step difference whose diameter is narrower than the diameter of the first space part is formed at a boundary between the first space part and the second space part, in a case where a pressure from the oil is less than a first pressure, the valve body abuts against a valve seat formed in the second space part by using a restoring force of the elastic body, and a flow of the oil to the first space part is blocked by the valve body and the valve seat, and in a case where the pressure from the oil is equal to or greater than the first pressure, the valve body is moved in a first direction to be separated from the step difference, and the oil at least flows to the first space part.

5. The relief valve as claimed in claim 1, wherein
the oil applies a pressure to the first surface formed on the side of the first end, among the surfaces which the valve body has,
the elastic body applies a restoring force to a second surface formed on a side of a second end different from the first end in a longitudinal direction of the first space part, among the surfaces which the valve body has, and
the third space part is formed to open in a vertical direction with respect to a first direction and a second direction in which the valve body reciprocates through the restoring force from the elastic body and the pressure from the oil.

6. The relief valve as claimed in claim 1, wherein the first space part is provided in a housing, and is a space in which the valve body moves reciprocally, the second space part is a space adjacent to the first space part, and serves as a flow path through which the oil flows to the first space part, the third space part is a hole connecting the first space part and outside, and, in a case where a pressure from the oil is equal to or greater than a valve opening pressure, the oil flowing to the first space part is discharged to the outside, the elastic body is a spring that expands and contracts in the direction in which the valve body moves reciprocally, contracts by the pressure from the oil, and applies a restoring force to the valve body when expanding, the valve body moves reciprocally in a longitudinal direction in the first space part in accordance with a strength relationship between the restoring force from the elastic body and the pressure from the oil, and switches between whether to allow the oil to flow from the second space part to the first space part.

7. The relief valve as claimed in claim 1, wherein at a boundary between the first space part and the second space part or in the second space part,
a step difference or a taper part whose diameter is narrower than the diameter of the first space part is formed.

8. A pump cover, having the release valve as claimed in claim 1.

* * * * *